Nov. 10, 1959 C. W. LUFCY 2,912,515

MAGNETIC TRANSDUCER HEAD FOR TAPE RECORDING, PLAYBACK AND ERASING

Filed May 17, 1955 2 Sheets-Sheet 1

INVENTOR
C. W. LUFCY

BY

ATTORNEYS

Nov. 10, 1959 C. W. LUFCY 2,912,515

MAGNETIC TRANSDUCER HEAD FOR TAPE RECORDING, PLAYBACK AND ERASING

Filed May 17, 1955

2 Sheets-Sheet 2

INVENTOR
C. W. LUFCY

BY G. D. O'Brien
W. E. Quesenberry
ATTORNEYS 2,912,515

MAGNETIC TRANSDUCER HEAD FOR TAPE RECORDING, PLAYBACK AND ERASING

Carroll W. Lufcy, Silver Spring, Md.

Application May 17, 1955, Serial No. 509,129

1 Claim. (Cl. 179—100.2)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in magnetic record transducing heads of the type which are used in magnetic recording systems for recording magnetic signals or reproducing magnetically-recorded signals by magnetic flux interlinkage between relatively moving magnetic elements of a magnetic recording medium and windings of the magnetic transducer head which is used either for recording or for reproducing the signals or for erasing signals on the recording medium, and more particularly pertains to a transducer head core of a magnetic alloy composed of a specific aluminum-iron composition produced under definite fabricating conditions and which is characterized by high magnetic and resistive properties and extreme physical hardness.

The stability of operating conditions between the non-magnetic gap region of a magnetic transducer head and the magnetic record track bridging the gap determines the effectiveness of the magnetic recording and reproducing process. Since conventional recording and reproducing systems employ thin magnetic wires or tapes of a ferro-magnetic alloy that is harder than the relatively soft metal of the core, difficulties have been encountered in obtaining stable operating conditions between recording medium and the gap pole faces due to the magnetic wire or tape wearing grooves into the softer pole faces along which the recording medium passes.

Furthermore, due to the low resistivity characteristics of conventional transducer head cores, relatively high eddy current losses are present which deleteriously affect the applicability thereof at the higher frequencies. Also, for use at the higher frequencies conventional cores require a high biasing power which causes undesirable high temperatures in the core.

Moreover, due to prior art cores being of soft metal, the ends of the laminations forming the interfaces of the non-magnetic gap become frayed during the construction of the core and are further constrained when a spacer is inserted in the gap. This constraining and fraying of the lamination ends causes virtually complete loss of high permeability at the gap interfaces, resulting in an electrical flux gap resolution that is approximately twice the physical gap dimension thereby further decreasing the effective responsiveness thereof at high frequencies.

An ideal core material for magnetic record and reproduce heads of the type in which the head is in direct contact with the recording medium would be one which is not only magnetically soft but also physically hard. It is necessary that the core material be magnetically soft, particularly in playback units, if suitable electrical characteristics are to be obtained. If a physically hard material is used, the head life which is usually limited by the abrasive action of the recording medium will be increased. That such a combination of magnetically soft and physically hard material is unusual, is evidenced by the fact that Permalloy, physically a very soft magnetic material, is used in practically all applications of this type. Ferrites have been used in an effort to circumvent the head wear problems. However, despite their physical hardness, their magnetic properties are not as suitable as Permalloy. In addition, other problems of physical and magnetic non-uniformities lead to fabrication or other difficulties which result in inferior units.

The present invention contemplates the utilization of a transducer head core composed of a cold-rolled aluminum-iron alloy of high aluminum content, which alloy overcomes the above disadvantages of prior art core material. In accordance with the present invention, the magnetic material utilized to form the core comprises a binary alloy of between 10 to 16% aluminum with the balance iron, which alloy is commercially known as Alfenol, in lieu of the Permalloy, molybdenum-Permalloy, Mumetal or silicon-iron presently used in transducer head cores.

The present invention also contemplates the employment of Thermenol, which is a modified alloy of Alfenol, as the core material. Alfenol is disclosed in the copending application of Joseph F. Nachman, Ser. No. 412,963, now U.S. Patent 2,801,942, filed February 26, 1954, and assigned to the U.S. Government; and Thermenol is described in the copending application of Joseph F. Nachman et al., Ser. No. 448,398, now U.S. Patent 2,859,143, filed August 6, 1954, and licensed to the U.S. Government.

In the process of making the aluminum-iron alloy, known as Alfenol, the iron is melted in a suitable furnace such, for example, as a high frequency furnace. After melting the iron the aluminum is added thereto. After allowing sufficient time to permit proper mixing of the aluminum and iron, the temperature is regulated and the melt is cast into a slab mold designed to produce a fine, preferably, an equiaxed grain structure. The slab is then reduced in thickness by hot rolling at temperatures between 1000° C.–1050° C. from 1" to substantially 0.250", the last or final hot rolling operation to a thickness of 0.125" being conducted at about 900° C. in order to obtain full benefit from the grain refinement occurring at the lower temperature. For example, alloys containing from 10 to 20% aluminum have a tendency to order into an $Fe_3Al$ type lattice, which is believed to be mechanically softer than the disordered phase. If the aforesaid 0.125" material was rolled on down in the order-disorder temperature range, which lies in the neighborhood of 450° C. or somewhat below 600° C., with the alloy maintained in this order or partly ordered condition, it would be sufficiently ductile to enable rolling the material to any desired thickness. The cold rolling and elevated temperatures employed with the method of producing Alfenol is conducted at average temperatures of 500° C., 550° C. and 575° C., the latter being the most desirable. The temperature variations of the furnace during the fabrication during the on and off cycles is 550° C.–600° C. whereupon an average temperature of 575° C. was obtained. This technique is carried out by allowing the alloy to heat for a few minutes between passes of the material through a suitable rolling mill. By the cold rolling method sheets from 0.014" to 0.0035" in thickness are capable of being produced.

It has been noted that the finished sheet of Alfenol rolled at 575° C. develops a surface coating of essentially aluminum-oxide which is not effectively reduced by high temperature anneal and hydrogen. In fact, the quality of the aforesaid insulation appears to improve when the sheet is subject to the high temperature hydrogen anneal. The thickness of the oxide insulating coating is a function of the temperature, time and type of atmosphere employed. One of the advantages of the thin surface oxide coating, especially in laminated cores, is that it facilitates stacking of the laminations since the usual insulating spacers between laminations employed heretofore may be eliminated.

The material, Alfenol, produced by the aforesaid method is not highly grain oriented; in reality, the material is magnetically isotropic, in contradistinction to the anisotropic material produced by silicon-iron alloys. The aforedescribed cold rolling denotes cold working of the alloy at a temperature below the recrystallization temperature, whereas the hot rolling denotes hot working the alloy at a temperature above the recrystallization temperature. In the hot rolling process, for example, the metal is recrystallized, while in the cold rolling process, the crystal structure remains the same and the crystals are elongated.

An alternate method of producing Alfenol is as follows:

Rolling the material at 575° C. from 0.125" to 0.028"; annealing at 575° C. for a short time to produce partial ordering thereof; rolling, from 0.028" to 0.014" at room temperature and thereafter annealing the 0.014" material at 575° C. for a short time; cold rolling from 0.014" to 0.007" and annealing the strip of 0.007" material for a short time at 575° C.; the final operation consisting of cold rolling the strip of 0.007" material to any predetermined thickness desired.

An alloy fabricated in the manner hereinbefore described produces a magnetic material having desirable transducer head magnetic characteristics and possessing isotropic magnetic properties and high bulk resistivity which prevents electrical losses. Moreover, in the fabrication of Alfenol, the material developed its own insulating layer and thus in various magnetic applications, the usual insulating fabrication process can be eliminated. The term "Alfenol," where hereinafter recited, shall be construed to denote an aluminum-iron alloy containing 10 to 16% aluminum with the balance iron and fabricated in the manner herein described, or as more specifically described in the aforesaid copending application, Serial No. 412,963.

Thermenol, a modified alloy of Alfenol, consists of 10 to 18% aluminum, 0 to 5% of any one or any combination of the elements Mo, V, Cr, Ti, Ta, Cb, W, and B as strengthening additives, the remainder or basic alloy being iron. The term "Thermenol," where hereinafter recited, shall be construed to denote an alloy consisting of aluminum, iron and a strengthening additive in the proportions mentioned and fabricated in the manner subsequently to be described, or as more fully described in the aforesaid copending application, Serial No. 448,398.

In the method of producing Thermenol, the melting of the aforesaid alloys may be performed in any suitable type of melting furnace such, for example, as a vacuum or controlled atmosphere induction furnace. For purpose of clarity in describing the operations, an example melt of 16% aluminum, 3.3% molybdenum, 80.7% iron will be described. The first step in the melting operation is to melt the iron and molybdenum under vacuum. After the elements are completely melted, wet and dry hydrogen gas are passed over the melt. This operation is performed for the purpose of decarburizing and de-oxidizing the iron molybdenum molten solution. Helium is then introduced into the tank to displace the hydrogen and, when the gaseous mixture in the furnace chamber no longer supports a combustion, all of the hydrogen that may have been dissolved in a molten alloy has been removed. After this is completed, helium is introduced again into the furnace chamber until one atmosphere of helium is present. At this time, 16% of aluminum is added to the melt and the furnace chamber is again evacuated (using a vacuum pump) to a pressure of 5 mm. of helium. When this pressure is obtained, and the optimum pouring temperature is reached, the melt is poured. Pouring may be either into a suitable mold for shaping the material into a final cast shape or it may be poured into an ingot or slab-type mold, forming an ingot or slab for subsequent rolling, swaging or extrusion into strips, sheets, rods, wire or other shapes.

Immediately following the pouring operation, the cast slab is stripped from the mold while still redhot and placed in a furnace at 1050° C. for about 2 hours and allowed to cool with the furnace, at a rate of approximately 30° C. drop in temperature per hour. After the cooling operation, the slab is hot rolled to a thickness of 0.250" at a temperature of 1050° C. At a thickness of 0.250", the hot rolling is performed at 950° C. When the strip has been finished to about 0.1", the cold rolling operation is in order.

The cold rolling operation is performed at about 575° C., and may be considered cold rolling for the reason that the temperature is below the recrystallization temperature.

After rolling the material into sheet form of a predetermined thickness it has a naturally formed coating of aluminum and iron oxides upon the surface which serves as an insulator. Thermenol produced in this manner is characterized by a maximum permeability of 130,000, initial permeability of 6500, coercive force of 0.017 oersted, a maximum saturation of 5800 gausses, a hardness in the range of 20 to 35 Rockwell C, and an electrical resistivity of the order of 150 to 160 micro-ohms per centimeter.

It is an important object of the present invention to provide a transducer head core constructed of a magnetic material which is both magnetically soft and physically hard.

Another object of the invention is the provision of transducer head core material that possesses isotropic magnetic characteristics and relatively high specific electrical resistivity of the order of 150 micro-ohms per centimeter.

Still another object is to provide a transducer head core material which has improved response at high frequencies and requires substantially less biasing power at the high frequencies than transducer core material used heretofore.

A further object of the invention is the provision of a transducer core material that enables use of slower recording tape speed which results in considerable savings in tape cost.

Another further object is to provide a transducer core of such material as to be capable of having a non-magnetic gap therein which is characterized by an electrical gap resolution substantially equal to the physical gap dimension.

A still further object is to provide a magnetic material for a transducer core which has a longer life use than heretofore attained.

A further object resides in the provision for a transducer core of a magnetic material which has an inherent aluminum-oxide coating thereby eliminating the necessity of providing insulation between laminations during the fabrication of the core.

Another object resides in the provision of a new and improved transducer core material which is highly resistant to eddy current losses.

A primary object of the invention is to provide a transducer core material that is characterized by extreme hardness, high electrical resistivity, resistance to loss of magnetic properties due to strain, and excellent magnetic properties.

It is another important object of the invention to provide for a transducer core an aluminum-iron magnetic material characterized by a hardness of the order of 20 to 30 Rockwell C, a specific electrical resistivity of 150 to 160 micro-ohms per centimeter and an inherent aluminum-oxide insulation coating.

It is another important object of the invention to provide a transducer core material comprised of an aluminum-iron alloy having an aluminum content of 10 to 16 percent and which alloy has first been rolled above the recrystallization temperature to a predetermined thickness and then rolled below the recrystallization temperature to a thickness suitable for core construction purposes.

A still further object is to employ Alfenol as the core material for a transducer head.

Another further object is to employ Thermenol as the core material for a transducer head.

The exact nature of this invention as well as other objects and advantages thereof will be readily apparent from consideration of the following specification relating to the accompanying drawings in which.

Figure 1:
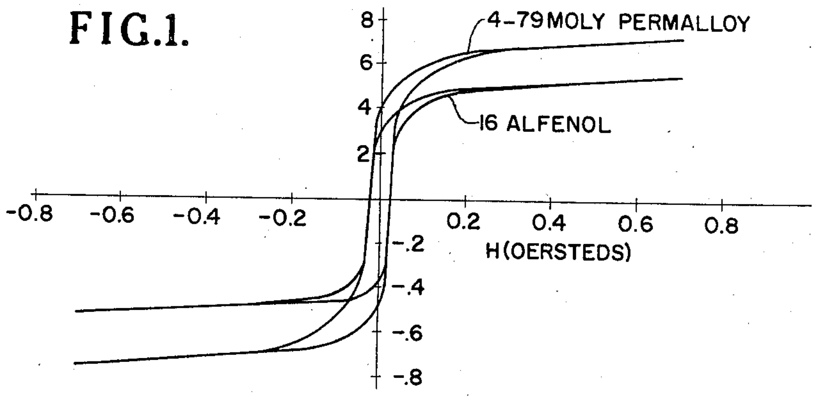
Figure 1 shows the hysteresis loops of an Alfenol alloy containing 16% aluminum and of a molybdenum-Permalloy composition which is a commercial alloy commonly used in record and reproducing units.

Referring now to Figure 1, it is clearly apparent by the similarity of the B–H loops that Alfenol has magnetic characteristics similar to molybdenum-Permalloy. Table I, below, gives a comparison of some of the magnetic and physical characteristics of a molybdenum-Permalloy unit with a sample unit of Alfenol.

TABLE I

*Comparison of Alfenol and Permalloy properties*

| | Max. Permeability, $\mu_{max}$ | Initial Permeability ($\mu_2$ at B=20) | Coercive ($H_c$) | Saturation ($B_{max}$) | Remanence ($B_R$) | Electrical Resistivity (Micro-Ohm-cm.) | Hardness | |
|---|---|---|---|---|---|---|---|---|
| | | | | | | | Rockwell | Brinnel |
| Alfenol, 16% Al, 84% Fe | 116,000 | 3,450 | 0.025 | 7,825 | 3,800 | 150 | 25 $R_c$ | 256 |
| Moly-Permalloy (4–79) (commercial grade) | 112,600 | 16,600 | 0.023 | 8,490 | 5,200 | 45 | 60 $R_b$ | 100 |

Inspection of Table I shows that magnetically, Alfenol compares very favorably with M-Permalloy with the possible exception of the initial permeability. On the basis of both electrical resistivity and hardness, however, Alfenol possesses exceptional properties, particularly for an application such as record and reproduce heads. The extremely high electrical resistivity of Alfenol gives a much lower eddy current loss value over M-Permalloy. The hardness of 25 Rockwell C scale of the aforesaid Alfenol sample unit approaches tool steel hardness as compared to the extreme soft nature of Permalloy. The hardness of Alfenol varies within the range of 20 to 30 Rockwell C, depending upon the percentage content of aluminum and iron. Because of Alfenol's extreme physical hardness, it resists degradation of its mangnetic properties through strain induced in processing and handling, and thus it is possible to retain a good magnetic structure even after relatively severe fabrication, handling and working. Molybdenum-Permalloy, on the other hand, must be handled with extreme care if a reasonable percentage of the properties obtained by careful annealing are to be retained throughout the fabrication process.

In the rolled sheet form, Alfenol has a very thin tightly adherent film of aluminum-oxide on its surface, as aforedescribed. This film in turn forms an excellent surface insulation when laminations punched from the sheet stock are stacked. Thus excellent inner stack insulation is possible with high stacking factors in laminated cores made from Alfenol.

Table II, below, shows the results of several Alfenol units tested.

TABLE II

*Physical and electrical measurements of gap interface*

| Test Unit No. | Core Material | Measurements | |
|---|---|---|---|
| | | Physical (Optical With Filar Eyepiece) | Electrical (First Null Method) |
| 1A | Alfenol | 0.000250″ | 0.000259″ |
| 2A | do | 0.000223″ | 0.000240″ |
| 3A | do | 0.000430″ | 0.000452″ |
| 2P | Molybdenum-Permalloy | 0.000430″ | 0.00055″ |

The heads of Table II were fabricated from 0.006″ cold rolled Alfenol sheet stock using conventional fabrication techniques. In order to accurately measure the physical vs. electrical gap spacing, high precision, hard temper beryllium copper foil was utilized as a spacer material. Foil thickness varying from 1000 to 230 micro-inches were used to establish the physical gaps.

In order to obtain comparative data between Alfenol and molybdenum-Permalloy, tests were made in three categories, namely (1) resolution or frequency response, (2) head life and (3) core losses. As a reference standard, molybdenum-Permalloy heads of identical physical construction were used.

The electrical resolution of the units was measured at a tape speed of 3.75″ per second by determining the frequency at which the first null appeared. This null in head output occurs when the recorded wave length on the tape is equal to the electrical gap dimension of the reproducing head. The 3.75″ per second tape speed was chosen for these measurements because it affords a lower first null frequency for a given recorded wave length. Table II, given heretofore, shows the physical vs. electrical gap measurements of several Alfenol units tested and of a molybdenum-Permalloy unit. It is to be noted that in all the Alfenol units measured, the electrical resolution and physical gaps were practically the same. The physical measurements of Table II were made by directly measuring the gap under an optical microscope using a filar-type eyepiece which had been calibrated by a precision ruled stage. The electrical measurements were made as previously described. Comparison of the two shows a close correlation. Similar checks made on Permalloy units shows, as indicated in Table II, that the electrical gap exceeds the physical gap by considerably larger amounts than the Alfenol units. The superiority of Alfenol in holding an electrical resolution very nearly the same as the physical resolution is accounted for in part by the fact that during the lapping of the gap faces, very little loss in magnetic properties in the face surfaces was incurred. It is known that a lapped surface is severely cold worked, and this cold working results in virtually complete loss of high permeability in the material. However, due to Alfenol's extreme hardness the depth of the coldwork permeability loss is apparently very small. Molybedenum-Permalloy, however, because of its softness, has a tendency to flow or smear, resulting in a much deeper penetration of the cold-work surface. Thus a limitation is established on electrical resolution for M-Permalloy which is caused by the loss of magnetic properties of the inner surface of the gap. This permeability boundary creates an apparent air gap with poorly defined limits, this effect being illustrated in Figures 2, 3A and 3B.

Figures 2, 3A, 3B, 4:
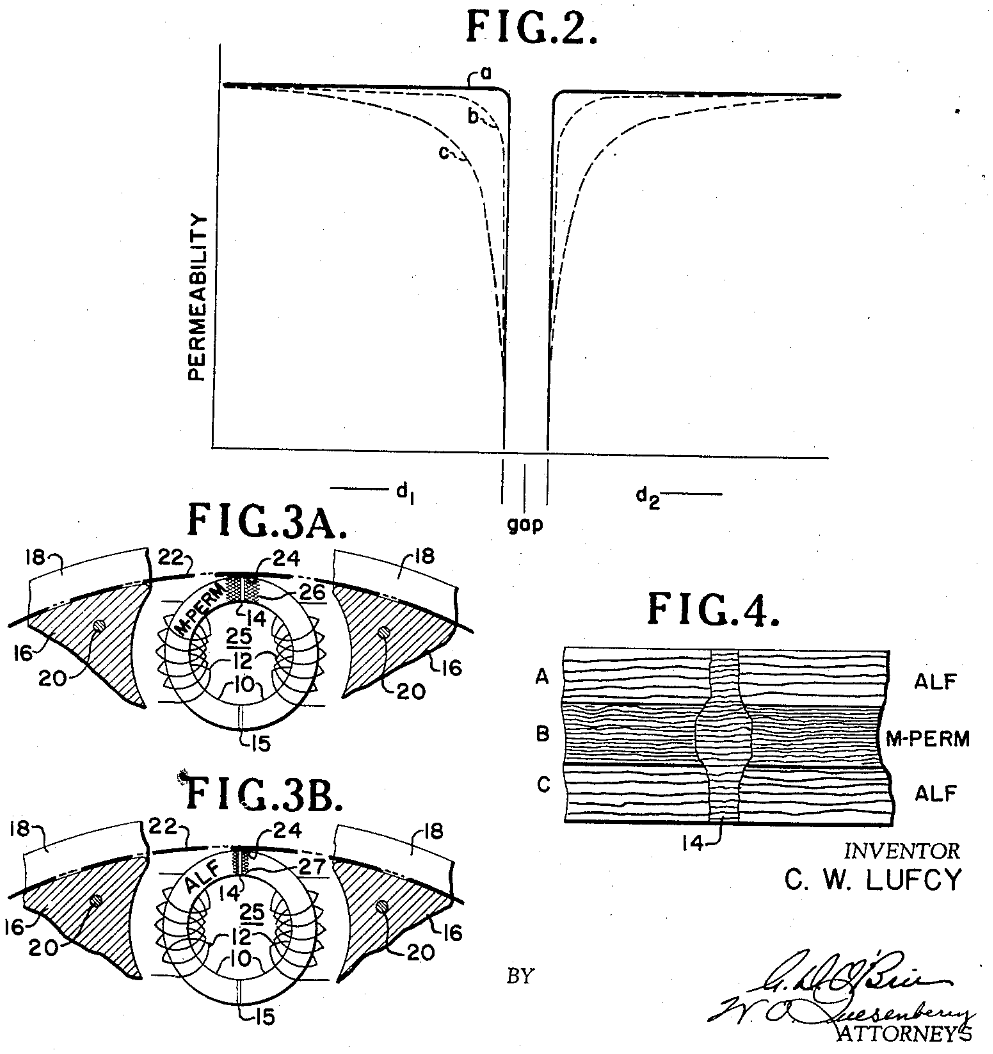
Figure 2 illustrates the permeability characteristics of an ideal core, an Alfenol core, and a molybdenum-Permalloy core.
Figures 3A and 3B are illustrative comparisons of the gap-fringing permeability loss in a molybdenum-Permalloy core and an Alfenol core.
Figure 4 illustrates the comparative constraining of the pole faces between molybdenum-Permalloy and Alfenol.

Referring now to Figure 2, curve *a* represents the ideal case where core material permeability remains high and abruptly drops to a value of 1 (air) at the gap insert. In this case both physical and electrical resolution would be practically the same. Curve *b* shows the effect of a slight permeability at the core material surface, while curve *c* illustrates a more severe or deep boundary which would result from excessive cold working of the surface. From a comparison such as is given in Table II, it may be concluded that Alfenol shows this effect only slightly and would be represented by a curve such as *b* while the M-Permalloy curve would be as represented by say curve *c*.

Figures 3A and 3B more clearly illustrate the comparative permeability boundary effect of molybdenum-Permalloy and Alfenol, respectively. Referring now to Figures 3A and 3B, which are similar illustrative recording arrangements with like reference characters designating like or corresponding parts, there is shown in a simplified diagrammatic manner the principal elements of a conventional magnetic recording system utilizing a molybdenum-Permalloy core in Figure 3A and an Alfenol core in Figures 3B. It is to be understood that, although the arrangements of Figures 3A and 3B will be operatively described as a recording system, the arrangement may function as a reproducing or erasing system. An elongated magnetic recording medium 22, such as a ferro-magnetic wire or tape, or some other form of magnetic recording medium as known to those skilled in the art, is arranged to move from one reel to another (not shown) past a pole face region 24 of a recording, playback or erasing head, indicated generally as 25, the medium 22 travelling along a guide channel 18 in a guide member 16 rigidly supported as by bolts or screws 20.

The transducer head 25 embodies a magnetic core structure formed of two like pole pieces 10, which may be fabricated by stacked laminations, or in solid bulk form, or in any other manner suitable for transducer core purposes, and transducer windings interlinked with the core shown formed of two like transducer winding coils 12, one coil for each pole piece unit. Although the pole pieces 10 of Figure 3A are legended M–PERM to signify a core constructed of molybdenum-Permalloy, it is to be understood that the core of Figure 3A represents a conventional core fabricated from any of the presently used transducer core material such, for example, as Permalloy, Mumetal or silicon-steel. It is further to be understood that, in accordance with the invention, although the core is shown as comprising two semi-circular pole pieces, the core may have any configuration or non-magnetic gap arrangement known to those skilled in the art. The pole pieces 10 forming the core structure are aligned as to define non-magnetic gaps 14 and 15 which may be air gaps or may be filled with beryllium copper, Mylar, dielectric, or any suitable material serving the desired purpose.

In recording operation, as the recording medium 22 passes over the gap region 14, the medium 22 is subjected to a magnetic recording flux produced by the combined effects of amplified signal currents, which are to be recorded and supplied to the windings 12 from a signal translating source, and a superimposed high frequency biasing flux component produced by a high frequency current supplied to windings 12 from a biasing source of high frequency.

In conventional transducer heads as represented by the core material in Figure 3A, it has been found that, since the highly permeable magnetic material of the pole pieces is much softer than the material used as the recording medium, the abrasive action caused by the motion of the relatively hard recording medium wears away the soft magnetic material of the pole pieces, and after a period of use, the recording medium wears into the pole faces 24 a groove which deleteriously affects the responsiveness of the recording system. In contradistinction, with the Alfenol core represented in Figure 3B being physically harder than the recording medium, the abrasive action is reduced to a minimum, thereby substantially prolonging the life span of the transducer head core. As to the permeability boundary effect discussed above, the cross-hatched area 26 of Figure 3A illustrates the relatively large ineffective permeability area of conventional transducer core materials as compared to Alfenol's small and virtually non-existent ineffective permeability area shown by the cross-hatched area 27 of Figure 3B. It is to be understood that the cross-hatched areas 26 and 27 are not exactly proportionally to scale but are exaggerated for purposes of illustration.

A second factor which accounts for the improved resolution obtained with Alfenol is that, although spacer material from the same beryllium copper foil was used in fabricating both types, the optical measurements from the Alfenol units were consistently lower than those from the M-Permalloy unit. To check this an experimental unit was constructed with a special molybdenum-Permalloy lamination sandwiched in between standard Alfenol laminations, which is shown in microscopic form in Figure 4. Figure 4 shows an M-Permalloy lamination B sandwiched between two Alfenol laminations, A and C, with a beryllium spacer 14 inserted in the gap. It is clearly apparent from an examination of Figure 4 that where the Alfenol was in contact with the spacer, the spacer thickness was essentially the same as the original foil. However, where the softer M-Permalloy is in contact with the spacer, the lapping apparently caused the spacer foil to flow into the soft material. This resulted in an apparent thickening of the beryllium copper spacing. The conclusion reached from this observation is that unlike Alfenol, M-Permalloy does not possess sufficient physical hardness to constrain the hard beryllium copper insert to its original thickness during lapping and finishing operations on the pole faces. This effect combined with the permeability boundary effect indicates that, where high resolution is desired, Alfenol is superior to M-Permalloy.

Figure 5:
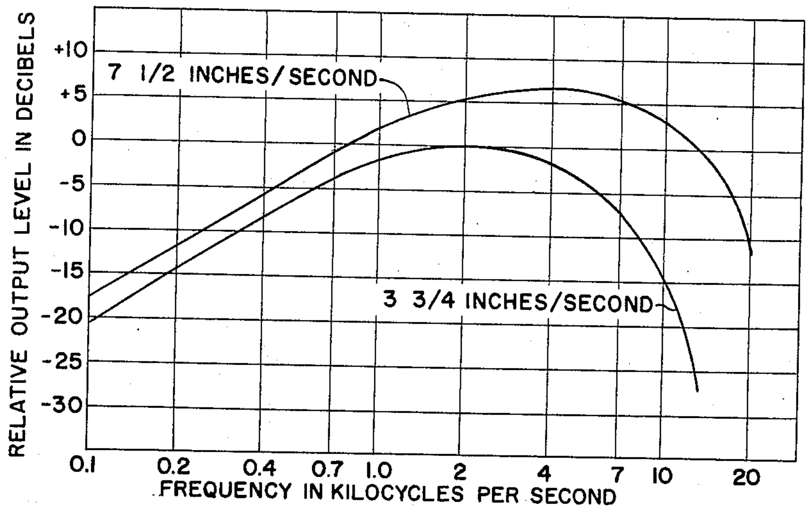
Figure 5 shows the frequency response curves for an Alfenol unit with a 230 micro-inch physical gap.

Referring now to Figure 5, there is shown the frequency response curves for an Alfenol unit with a 230 micro-inch physical gap at tape speeds of 7½" per second and 3¾" per second. It is apparent from an examination of these curves that the electrical resolution of this unit approaches very closely the physical gap dimension. It should be further noted that at a wave length of one mil, a frequently quoted commercial limit of resolution, the unit shows a total loss of only 1½ db; whereas, under similar conditions, a loss of 10 to 15 db is not unusual in commercial units. In critical applications where high signal-to-noise ratios, wide dynamic range, and system calibration accuracy are essential, an Alfenol unit with these characteristics is superior to any of the conventional present commercial units. This is apparent when one considers the fact that, with constant current recording and no post emphasis other than the normal low frequency equalization of 6 db/octave, a system response of ±1 db for wave lengths as short as 1 mil is possible with a head of this type. Using approximately 20 db pre-emphasis, a transducer head having an Alfenol core is capable of excellent reproduction of music up to 12,000 cycle per second at a tape speed of 3.75 inches/sec.

Figure 6:
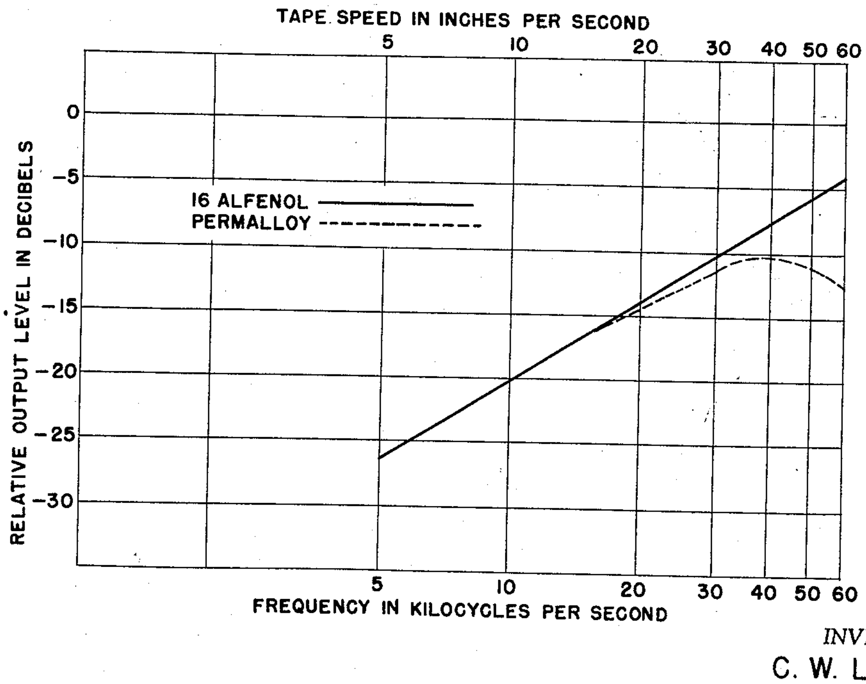
Figure 6 illustrates the comparative output of Alfenol with molybdenum-Permalloy under varying frequency conditions.

As is noted from Table I above, Alfenol has an inherently high electrical resistivity which characteristic results in a considerable decrease in core losses for record and reproduce units employing cores of Alfenol. In a test conducted to compare core losses arising out of electrical resistivity, a signal of 5000 c.p.s. was recorded at a tape speed of 5" per sec. using a standard transducer head. The tape was then played back with an Alfenol core reproduce head at speed increments to obtain playback frequencies of 5, 10, 20, 30, 40, 50 and 60 kc. For comparison, a duplicate set of measurements were made using a molybdenum-Permalloy playback head. Results of these tests are shown in Figure 6 wherein the curves were derived from plotting the output against frequency. It is to be noted that up to a playback frequency of 60 kc., the Alfenol unit showed no deviation from the normal 6 db/octave rise, as compared to a drop of approximately 7 db in the molybdenum-Permalloy unit at this same frequency.

In another test conducted for determining the use of Alfenol for transducer heads, the bias power required at 200 kc. to give effective bias in the tape was measured and compared to the power required in a molybdenum-Permalloy head to produce the same results. In the testing procedure, the reactive and resistive components of each head were measured on a precision bridge at levels low enough so that further decrease in level caused no change in bridge balance. The results showed that the power required for the bias at 200 kc. to the Alfenol head was 0.0312 watt, while that to the M-Permalloy head was 0.0718 watt. Thus it is seen that the power required by the Alfenol head was only 43.5% of that required by the M-Permalloy head.

Thermenol, a modified alloy of Alfenol, has characteristics similar to Alfenol and therefore provides the same advantages over M-Permalloy cores as does Alfenol. It is further to be noted that Thermenol is also physically as hard as Alfenol, the hardness of Thermenol being in the range of 20 to 35 Rockwell C scale.

The advantages of wear resistance, substantially constant resolution, and decrease in core loss which Alfenol and Thermenol possess, all combine to make these materials extremely promising for video recording on tape. In video recording, the requirements for high frequency reproduction at low losses and for high resolution in reproduce heads fall in line with the properties possessed by Alfenol and Thermenol.

As previously mention, the high resolution obtainable with Alfenol and Thermenol reproduce heads makes practical the reproduction of wide range audio signals at tape speeds of 3.75" per sec. This factor alone enables large savings in tape cost without undue sacrifice in playback quality in the home recorder field.

From the foregoing, it is apparent that the invention provides the utilization of a core material of isotropic magnetic properties having a high resistivity that decreases eddy current losses and does not require high biasing power at high frequencies.

It is also apparent that the invention provides a magnetic core that is physically harder than conventional cores thereby providing core of prolonged life-use that has an electrical gap resolution approximating the physical gap resolution.

It is further apparent that the core material utilized by the invention has an inherent aluminum-oxide insulation coating which eliminates the necessity of providing insulating material between laminations in the fabrication of laminated transducer head cores.

Moreover, it is apparent that the invention utilizes a core material composed of a high aluminum content cold-rolled aluminum-iron alloy which is materially superior to core materials presently in use in transducer record and reproduce heads.

Obviously many modifications and variations of the present invention are possible in the light of the above teachings. It is therefore to be understood, that within the scope of the teachings herein and the appended claim, the invention may be practiced otherwise than as specifically described.

What is claimed and desired to be secured by Letters Patent of the United States is:

A magnetic core for a record and reproduce transducer head having a portion defining a pair of faces and a gap of less than about 800 microinches therebetween, and presenting an abrupt precisely defined magnetic discontinuity, said portion adjacent to the gap being composed of a material selected from the group consisting of Alfenol and Thermenol, and the magnetic permeability at said faces being substantially equal to the permeability of the remainder of said portion.

References Cited in the file of this patent

UNITED STATES PATENTS

| | | |
|---|---|---|
| 2,493,742 | Begun | Jan. 10, 1950 |
| 2,536,272 | Friend | Jan. 2, 1951 |
| 2,563,850 | Lindsay | Aug. 14, 1951 |
| 2,801,942 | Nachman | Aug. 6, 1957 |

OTHER REFERENCES

Masumoto et al.: Article on pp. 523–534 of the Sendai Tohoku University Science Reports.

Ferromagnetism, by Bozorth, 1951 edition, pp. 218–220.

Magnetic Recording, by Begun, 1949, pp. 105, 106.